(12) United States Patent
Gadgil

(10) Patent No.: US 7,892,436 B2
(45) Date of Patent: Feb. 22, 2011

(54) COMPOSITIONS AND METHODS FOR REMOVING ARSENIC IN WATER

(75) Inventor: Ashok Jagannth Gadgil, El Cerrito, CA (US)

(73) Assignee: The Regents of the University of California, Oakland, CA (US)

(*) Notice: Subject to any disclaimer, the term of this patent is extended or adjusted under 35 U.S.C. 154(b) by 449 days.

(21) Appl. No.: 11/912,104

(22) PCT Filed: Apr. 25, 2006

(86) PCT No.: PCT/US2006/015664
§ 371 (c)(1),
(2), (4) Date: Oct. 19, 2007

(87) PCT Pub. No.: WO2006/116421
PCT Pub. Date: Nov. 2, 2006

(65) Prior Publication Data
US 2008/0197081 A1 Aug. 21, 2008

Related U.S. Application Data

(60) Provisional application No. 60/674,835, filed on Apr. 25, 2005, provisional application No. 60/679,393, filed on May 9, 2005.

(51) Int. Cl.
*C02F 1/42* (2006.01)
*C02F 1/32* (2006.01)

(52) U.S. Cl. .......... 210/668; 210/669; 210/682; 210/688; 210/748.13; 210/913

(58) Field of Classification Search .......... 210/679, 210/682, 683, 684, 688, 748.1, 748.15, 748.13, 210/749, 756, 758, 198.1, 200, 201, 202, 210/205, 206, 209, 502.1, 506, 911, 912, 210/913, 668, 669; 428/406; 502/406, 407; 106/DIG. 1
See application file for complete search history.

(56) References Cited

U.S. PATENT DOCUMENTS 3,926,659 A * 12/1975 Bernhard et al. .......... 106/418
(Continued)

FOREIGN PATENT DOCUMENTS

CA 1 067 627 A1 12/1979
(Continued)

OTHER PUBLICATIONS

Schweitzer, P., "Corrosion-Resistant Linings and Coatings" 2001, Marcel Dekker, Inc. p. 266.*
(Continued)

*Primary Examiner*—Matthew O Savage
*Assistant Examiner*—Lucas Stelling
(74) *Attorney, Agent, or Firm*—Kilpatrick Townsend & Stockton LLP

(57) ABSTRACT

Compositions and methods and for contaminants from water are provided. The compositions comprise ferric hydroxide and ferric oxyhydride coated substrates for use in removing the contaminant from the water. Contacting water bearing the contaminant with the substrates can substantially reduce contaminant levels therein. Methods of oxidizing the contaminants in water to facilitate their removal by the ferric hydroxide and ferric oxyhydride coated substrates are also provided. The contaminants include, but are not limited to, arsenic, selenium, uranium, lead, cadmium, nickel, copper, zinc, chromium and vanadium, their oxides and soluble salts thereof.

9 Claims, 6 Drawing Sheets

A. Rinse with Ferrous salt solution (e.g., ferrous sulfate)

B. Rinse with water

U.S. PATENT DOCUMENTS

| | | | |
|---|---|---|---|
| 4,046,687 | A | 9/1977 | Schulze |
| 4,112,063 | A | 9/1978 | Buxbaum et al. |
| 4,366,128 | A | 12/1982 | Weir et al. |
| 5,043,080 | A * | 8/1991 | Cater et al. ............ 210/748.15 |
| 5,075,010 | A * | 12/1991 | Zhang ........................ 210/643 |
| 5,369,072 | A * | 11/1994 | Benjamin et al. ............. 502/84 |
| 5,556,545 | A | 9/1996 | Volcher et al. |
| 5,603,838 | A | 2/1997 | Misra et al. |
| 5,635,073 | A | 6/1997 | Aktor et al. |
| 5,858,249 | A | 1/1999 | Higby |
| 6,042,731 | A | 3/2000 | Bonnin |
| 6,197,201 | B1 | 3/2001 | Misra et al. |
| 6,200,482 | B1 | 3/2001 | Winchester et al. |
| 6,248,241 | B1 * | 6/2001 | Christensen et al. ........ 210/715 |
| 6,613,230 | B2 | 9/2003 | Krulik et al. |
| 6,824,690 | B1 | 11/2004 | Zhao et al. |
| 6,914,034 | B2 | 7/2005 | Vo |
| 2002/0003116 | A1 | 1/2002 | Golden |
| 2002/0036172 | A1 | 3/2002 | Del Signore |
| 2002/0113023 | A1 | 8/2002 | Krulik et al. |
| 2003/0116504 | A1 | 6/2003 | Vempati |
| 2003/0183579 | A1 | 10/2003 | Bandyopadhya et al. |
| 2004/0089608 | A1 | 5/2004 | Vo |
| 2004/0101971 | A1 | 5/2004 | Voice et al. |
| 2004/0108275 | A1 | 6/2004 | Shaniuk |
| 2005/0059549 | A1 * | 3/2005 | Vo .............................. 502/406 |
| 2005/0250644 | A1 | 11/2005 | Gadgil |

FOREIGN PATENT DOCUMENTS

| | | | |
|---|---|---|---|
| JP | 56-046240 | * | 4/1981 |
| WO | WO 2004/064078 A2 | | 7/2004 |

OTHER PUBLICATIONS

Report on Ernest Orlando Lawrence Laboratory: Laboratory Directed Research and Development Program, FY 2006, p. (v) and 42.*

"Berkeley Lab Currents" url: http://www.lbl.gov/Publications/Currents/Archive/Dec-03-2004.html retrieved on Jun. 12, 2005, 18 pp.

"The Arsenic Removal Project; the arsenic crisis," Blue Planet Run, 2004, pp. 1-6.

Ali, Ashraf M., et al., "Development of Low-cost Technologies for Removal of Arsenic from Groundwater," Technologies for Arsenic Removal from Drinking Water, pp. 99-120.

Apyron Technologies, "Apyron Technologies and the University of Houston Awarded Grant for Arsenic Removal Program," Air and Water Treatment Solutions, www.apyron.com/news_al.html (US), p. 1, (Jun. 28, 1999).

Clayton, Mark, "A race to fix a 30-year-old 'solution'" Water Conserve, dated Feb. 17, 2005., url: http://www.waterconserve.info/articles/reader.asp?linkid=39318, pp. 1-4.

Cliford, Dennis, "Anion Exchange with Choloride-form Strong-Base Resins," http://web.mit.edu/murcott/www.arsenic/templates/14UHouston.htm. Univ of Houston (US), p. 1-2, (Feb. 14, 2005).

Das, Dipankar, et al. "A Simple Household Device to Remove Arsenic from Groundwater and Two Years Performance Report of Arsenic Removal Plant for Treating Ground water with Community Participation," School of Environment Studies, Jadavpur University, Calcutta- 700 032, India pp. 231-250.

Database Biosis 'Online! Biosciences Information Service, Philadelphia, PA, US; Sep. 2002, Lin Chiu-Yue et al. "Removal of pollutants from wastewater by coal bottom ash." XP002331129 Database accession No. PREV200300040842 abstract and Journal of Environment Science and Health Part a Toxic-Hazardous Substances and Environmental Engineering, vol. A37, No. 8, Sep. 2002, pp. 1509-1522, ISSN: 1093-4529.

Edwards, Marc, et al. "Adsorptive filtration using coated sand: a new approach for treatment of metal-bearing wastes," 1989, pp. 1523-1533.

Gadgil, Ashok, et al. "Arsenic Removal from Drinking Water," Lawrence Berkeley National Lab (US), p. 1-11, (Feb. 1, 2004).

Gilles, Greg, et al., "Arsenic Reduction Challenges in India and Bangladesh," Water Conditioning and Purification, 2000, 3 pp.

Joshi, Arun, et al. "Removal of Arsenic from Ground Water by Iron Oxide-Coated Sand," Journal of Environmental Engineering, 1996, pp. 769-771.

Krotz, Dan "Water Filter Could Help Millions of Bangladeshis," Research News, url: http://www.lbl.gov/Science-Articles/Archive/EETD-Gadgil-water-filter.html, dated Jan. 21, 2005, retrieved on Apr. 22, 2005, pp. 1-3.

Lawrence Berkeley National Laboratory, "Environmental Energy Technologies Division; News," 2005, vol. 6, No. 1, pp. 1-12.

McMullin, Michael, "High Efficienciecy Low-Cost Arsenic Adsorbent for Drinking Water," ADI International, Inc. (Canada), p. 1-9, (Mar. 1, 2004).

Patoczka HMM, Jurek, et al. "Trace Heavy Metals Removal with Ferric Chloride," Presented at Water Environment Federation Industrial Wastes Technical Conference, Nashville, TN, 1998, 14 pp.

Pescovitz, David. "Community Water Works," Lab Notes, url: http://www.coe.berkeley.edu/labnotes/0405/gadgil.html, dated Apr. 2005, retrieved on Apr. 22, 2005, pp. 1-3.

Tang-Quan, "Sci-Tech *Clean Water for Bangladesh*," The Daily Californian, url: http://www.dailycal.org/particle.php?id=17465, retrieved on: Feb. 7, 2005, pp. 1-2.

Thirunavukkarasu, O.S., et al. "Removal of Arsenic in Drinking Water by Iron Oxide-Coated Sand and Ferrihydrite-Batch Studies," Water Qual. Res J. Canada, vol. 36 (No. 1), p. 55-70, (Apr. 11, 2001).

* cited by examiner

A. Rinse with Ferrous salt solution (e.g., ferrous sulfate)

B. Rinse with water (With 5 gram LBNL media)

COMPOSITIONS AND METHODS FOR REMOVING ARSENIC IN WATER

RELATED APPLICATIONS

This application claims priority benefit of U.S. Provisional Patent Application Ser. No. 60/674,835, filed Apr. 25, 2005 and of U.S. Provisional Patent Application Ser. No. 60/679,393, filed May 9, 2005, the disclosures of which are incorporated herein by reference in their entirety for all purposes. This application is related in subject matter to U.S. patent application Ser. No. 11/06,5867, filed Feb. 24, 2005 and of U.S. Provisional Application Ser. No. 60/653,073, filed Feb. 14, 2005 and U.S. Patent Application Ser. No. 60/550,688, filed Mar. 4, 2004, the disclosures of which are incorporated herein by reference in their entireties for all purposes.

STATEMENT AS TO RIGHTS TO INVENTIONS MADE UNDER FEDERALLY SPONSORED RESEARCH AND DEVELOPMENT

This invention was made in the course of or under prime contract No. DE-AC03-76SF00098 between the U.S. Department of Energy and the Regents of the University of California for the management and operation of the Lawrence Berkeley National Laboratory. The United States Government has certain rights in this invention.

REFERENCE TO A "SEQUENCE LISTING," A TABLE, OR A COMPUTER PROGRAM LISTING APPENDIX SUBMITTED ON A COMPACT DISK.

NOT APPLICABLE

1. Field of the Invention

The invention relates to the treatment of water containing unwanted substances, including, but not limited to, arsenic, selenium or vanadium to remove the contaminant.

2. Background of the Invention

Many elements which are naturally found in the Earth's crust can find their way into surface or ground waters and present hazards to human health as well as the environment. Such elements include, but are not limited to, selenium, arsenic, vanadium, and chromium. For instance, arsenic is the 20th most abundant element in the Earth's crust and can be found naturally in air, water, soil, rocks and minerals. Erosion of rocks and minerals is believed to be the primary source of such naturally occurring contaminants in water supplies and in soil. Other sources can include urban runoff, industrial operations, treated wood, pesticides, fly ash from power plants, smelting and mining wastes.

Such contaminants may gain or lose electrons in redox reactions. As a result, for instance, arsenic may be present in a variety of redox states. Arsenate and arsenite are the two forms of arsenic commonly found in ground water. Water sources which are generally devoid of living organisms generally have inorganic arsenic in the form of arsenate (pentavalent arsenic) and arsenite (trivalent arsenic) in various ratios. Pentavalent arsenic is favored in oxidized waters. Under more reducing conditions, the amount of the arsenic in the trivalent, arsenite form increases. The dominant forms of arsenic present in natural waters at common pH (6-8) are the monovalent $H_2AsO_4^-$ and the divalent $HAsO^{2-}$ forms of arsenate and the uncharged form of arsenite, arsenious acid $HAsO_2$.

Many long term scientific studies have shown that long-term exposure to such contaminants can harm health. For instance, arsenic can cause many serious adverse effects on health. Ingested arsenic is readily absorbed. Exposure to arsenic through drinking water is associated with cancer of the lungs, bladder, skin, liver, and kidneys. Other health studies have indicated that consumption of drinking water contaminated with arsenic can cause other kinds of serious harm, including developmental defects, still birth, and spontaneous abortions as well as heart attacks, strokes, diabetes mellitus, and high blood pressure. Arsenic ingestion can also injure the liver, nervous system, and skin (arsenical dermatoses). The health effects may be delayed and take years to develop.

In particular, high arsenic content in drinking water originating from ground water sources is a serious problem in many parts of the world. About 60 million people in Bangladesh, a comparable number in India, and several million more in Nepal are adversely affected by high levels of arsenic (ranging from 60 ppb to 1200 ppb) in their drinking water. Millions more are exposed to moderately high levels (below 50 ppb but above 10 ppb). Levels of arsenic in drinking water are therefore closely regulated by government agencies (see, for instance, Public Health Goals for Chemicals in Drinking Water Arsenic, April 2004, Office of Environmental Health Hazard Assessment, California Environmental Protection Agency, State of California). To reduce the health risks, the United States Environmental Protection Agency (USEPA) has recently set a limit for arsenic in drinking water of 10 parts per billion (10 microgram/liter) or lower (see, USEPA, National Primary Drinking Water Regulations; Arsenic and Clarifications to Compliance and New Source Contaminants Monitoring, *Federal Register:* Jan. 22, 2001 (Volume 66, Number 14: 6975-7066)).

In other areas, contamination of water with selenium compounds is a health and environmental concern. Such areas include parts of Western North America, where seleniferous soils can leach selenium into the ground water. Similar to arsenic, selenium (Se) can exist in various chemical forms. The primary oxidation states of selenium are $^-2$ (e.g., $H_2Se$, hydrogen selenide), 0 (e.g., SeO), $^+4$ (e.g., $Na_2SeO_3$, sodium selenite) and $^+6$ (e.g., $Na_2SeO_4$, sodium selenate). Human activities such as mining, smelting, the burning of coal and oil and application of fertilizers may contribute to local selenium deposition on soil.

Elemental selenium ($Se^0$) is virtually insoluble in water. Selenium in water exists primarily as $Se^{+4}$ or $Se^{+6}$ in the form of biselenite, selenite and selenate ion. Selenium dioxide and selenium trioxide dissolve in water to form selenious acid and selenic acid, respectively, and the corresponding salts are selenites and selenates. For $Se^{+4}$, biselenite is more abundant at the lower drinking water pH range of 6.5 to 8.5. At pH 8, biselenite and selenite are at about equal concentrations. For $Se^{+6}$, selenate would be the only species present. Sodium selenate in neutral or alkaline conditions is water soluble and stable, and is the usual form of selenium in water.

Chronic oral exposure to high concentrations of selenium compounds can produce a disease called selenosis. The major signs of selenosis are hair loss, nail brittleness, and neurological abnormalities (such as numbness and other odd sensations in the extremities). The EPA restricts the amount of selenium allowed in public water supplies to 50 parts total selenium per billion parts of water (50 ppb).

A principal means of controlling the risks of such contaminants in drinking water is to find alternative sources of drinking water or, if alternative sources are not available in many parts of the world, to reduce the levels of such contaminants in the drinking water. The removal of the contaminants need not be complete to benefit the public health.

However, on the order of 100 million affected persons reside in areas with very low incomes, most in areas with incomes of less than U.S. $1 per person per day. Thus, technologies to remove contaminants from their drinking water need to be not only effective, but preferably of extremely low cost and operationally robust in a context of minimal resources and little formal technical training.

U.S. Pat. No. 6,042,731 to Dagmar Bonnin, entitled "Method of Removing Arsenic Species from an Aqueous Medium Using Modified Zeolite Material", incorporated herein by reference, discusses in the Background thereof the use of other agents such as activated alumina, activated carbon, and untreated fly ash for removal of arsenic from water. The Background of the '731 patent further teaches away from the use of fly ash as its properties are difficult to maintain. The '731 patent teaches methods alternative thereto which employ ferrous treated zeolites for treating arsenic-laden drinking water. The treatment of bottom ash is not disclosed in the '731 patent. Nor, does the patent disclose pretreatment with ultraviolet light exposure to first modify the aqueous arsenic to a higher valence state $As^{3+}$ to $As^{5+}$ so as to increase the relative amounts of the more readily adsorbed species.

Current methods of contaminant removal can be expensive and often slow or even ineffective at high contaminant concentrations. The methods also may require sophisticated maintenance and a highly skilled technician. For instance, one of the more inexpensive methods of removing arsenic is to react the arsenic with $Fe(OH)_3$ in the form of Granulated Ferric Hydroxide. Yet the method is comparatively expensive and requires a more complex set of operations in a reactor which requires a pressure drop and a great deal of technical supervision and monitoring.

The present invention provides for these and other needs by providing compositions and methods for removing contaminants from water which involve the manufacture of novel compositions and their use in methods of removing the contaminants from water.

SUMMARY OF THE INVENTION

This invention provides compositions having ferric hydroxide and/or ferric oxyhydride surface coatings and provides means for removing contaminants from water supplies by exposing the water to the compositions. Thus, in a first aspect, the invention provides ferric hydroxide and/or ferric oxyhydride coated-substrate compositions useful in the treatment of water to remove contaminants. In this aspect, the invention provides substrates coated with ferric hydroxide and/or ferric oxyhydride and methods of making them. The ferric hydroxide and/or ferric oxyhydride surface coatings according to the invention can be made by first selecting a hydrophilic substrate having a large surface area per unit of mass or unit of volume (or both) and treating the material by soaking it for a period of time in an aqueous solution of a soluble ferrous salt (e.g., ferrous sulfate, ferrous nitrate, ferrous chloride, ferrous iodide, ferrous bromide). The ferrous salt-treated substrate is next contacted for a period of time with an aqueous solution of a soluble base (e.g., $NH_4OH$, hydroxide salts such as sodium hydroxide, potassium hydroxide, lithium hydroxide, calcium hydroxide ($Ca(OH)_2$), alkali metal hydroxides). In this fashion, the surface of the substrate becomes coated with or adsorbs ferrous hydroxide and then the substrate is washed with water to remove the excess base or hydroxide. Next, the resulting substrate, i.e., ferrous-hydroxide-coated substrate can be air dried (with or without additional heating by exposure to the atmosphere) to convert the adsorbed ferrous hydroxide on the substrate to a ferric hydroxide and/or ferric oxyhydride coating. This product, a dried ferric hydroxide and/or ferric oxyhydride coated-substrate, is now ready for use in methods according to the invention.

Generally, these substrates are particles having a hydrophilic surface and about 1 to 100 microns in size or, more preferably, about 1 to 10 microns in size. The smaller the particle the greater the surface area to size/mass or volume ratio. In some embodiments of the above, the selected hydrophilic substrate has a surface area to volume ratio of greater 0.1 $m^2$ per $cm^3$ or 0.5 m per $cm^3$. In other embodiments, the selected hydrophilic substrate has has a surface area to volume ratio of greater than 50 $m^2$ per $cm^3$ or even 500 $m^2$ per $cm^3$. In some embodiments, the selected hydrophilic substrate is a fine powder. In other embodiments, the selected hydrophilic substrate is an organic or inorganic porous material having a highly regular or irregular structure of pores and chambers that are wettable or hydrophilic. In some embodiments, the selected hydrophilic substrate can be a fine powder (e.g., rice husk ash, bottom ash from coal combustion). In some embodiments, the material is glass (such as glass bead, finely ground glass, tumbled glass, etc.). In some embodiments, the material is fiberglass. In some embodiments, the material is a natural or synthetic sponge. Suitable selected hydrophilic porous substrates include, but are not limited to, porous unglazed ceramic materials (e.g., in the shape of plates or beads), pieces of whole or crushed porous rock, glass (such as glass beads, finely ground glass, tumbled glass, etc.), unglazed fired clay, zeolites, fly ash, diatomaceous earth, bottom ash (e.g., coal bottom ash including, but not limited to, bottom ash from a coal fired power plant) or the like (e.g., the ash left over from combusting wood or cellulosic materials (paper, rice stalks, other vegetative matter). In some embodiments, the substrate is made of a synthetic polymer such as polyester or a naturally occurring polymer such as cellulose. In some further embodiments for any such reading on such subject matter, there is a further embodiment wherein the hydrophilic substrate is not a zeolite, activated charcoal, charcoal, activated alumina, clay, diatomaceous earth, granulated ferric hydroxide, or fly ash. In some further embodiments for any such reading on such subject matter, there is a further embodiment wherein the hydrophilic substrate is not any one of zeolite, activated charcoal, charcoal, activated alumina, clay, diatomaceous earth, granulated ferric hydroxide, and fly ash. In embodiments when the coated substrate is to be used to remove arsenic from water, the coated substrate is based upon a substrate which is not a bottom ash, fly ash, or another combustion by-product from burning wood, coal, or plant materials. In embodiments where the coated substrate is used to remove contaminants other than arsenic from water, there are further embodiments in which the coated substrate is based on a substrate which can be bottom ash, fly ash, or another combustion by-product from burning wood, coal, or plant materials. In one embodiment, the substrate is a fly ash and the contaminant is an arsenic compound. In another embodiment, the substrate is fly ash and the contaminant is other than an arsenic compound.

In yet other embodiments, the hydrophilic substrate need not be a particle, but can be a woven material or a porous polymer which adsorbs ferric hydroxide. For instance, the substrate can be a cellulosic material (i.e., principally made up of plant cellulose (e.g., pressed paper, blotting paper, paper towel, flax, reeds, cotton fabric) or a pressed or woven material. In still other embodiments, the selected hydrophilic substrate is a textile material, such as a polyester, linen, jute, cotton, nylon or rayon. In one embodiment, the substrate is a fly ash.

Thus, in another aspect, the invention is drawn to the ferric hydroxide and/or ferric oxyhydride coated-substrate compositions themselves. Generally, these substrates are particles or materials as described above. Thus, they generally having a hydrophilic surface and about 0.1 to 100 microns in size, 1 to 100 microns in size or, more preferably, about 1 to 10 microns in size. In some embodiments, these compositions have a surface area of greater than 0.1 $m^2$ per gram or 0.5 $m^2$ per gram. In yet other embodiments, the ferric hydroxide and/or ferric oxyhydride coated-substrate has a surface area of greater than 50 $m^2$ per gram or even 500 $m^2$ per gram. In some embodiments, these compositions have a surface area to volume ratio of greater 0.1 $m^2$ per $cm^3$ or 0.5 $m^2$ per $cm^3$. In yet other embodiments, the ferric hydroxide and/or ferric oxyhydride coated-substrate has a surface area to volume ratio of greater than 50 $m^2$ per $cm^3$ or even 500 $m^2$ per $cm^3$. In some embodiments, the ferric hydroxide and/or ferric oxyhydride coated-hydrophilic substrate is glass (such as glass beads, finely ground glass, tumbled glass, etc.). In a preferred embodiment, the ferric hydroxide and/or ferric oxyhydride coated-hydrophilic substrate is a glass bead(s). In yet other embodiments, the ferric hydroxide and/or ferric oxyhydride coated hydrophilic substrate is an organic or inorganic porous material having a highly regular or irregular structure of pores and chambers that are wettable or hydrophilic. In still other embodiments, the ferric hydroxide and/or ferric oxyhydride coated hydrophilic substrate can be a fine powder (e.g., rice husk ash, bottom ash from coal combustion, fly ash from coal combustion).

In another set of embodiments, the ferric hydroxide and/or ferric oxyhydride coated hydrophilic substrate need not be a particle. The substrate can be a cellulosic material (e.g., flax, jute, pressed paper, blotting paper, paper or cloth (e.g., cotton, linen), fabric or textile. Additionally, the subject ferric hydroxide and/or ferric oxyhydride coated substrate can also be based on a substrate which is a pressed material or is a textile material. The fabric or textile may be a polyester or polyester blend or other permeable synthetic or natural polymer.

Other suitable ferric hydroxide and/or ferric oxyhydride coated hydrophilic substrates include, but are not limited to, those based on a substrate which is porous unglazed ceramic material (e.g., in the shape of plates or beads), pieces of whole or crushed rock, glass (such as glass beads, finely ground glass, tumbled glass, etc.), unglazed fired clay, and diatomaceous earth. In a particularly preferred embodiment, the ferric hydroxide and/or ferric oxyhydride coated hydrophilic substrate has a substrate which is bottom ash (e.g., bottom ash from a coal fired power plant) or the like (e.g., 'bottom' ash from combusting wood) or cellulosic materials (e.g., paper, rice stalks, and other vegetative matter). In some embodiments for any such reading on such subject matter, the hydrophilic substrate is not a zeolite, activated charcoal, charcoal, activated alumina, clay, granulated ferric hydroxide, diatomaceous earth, or fly ash. In still other embodiments for any such reading on such subject matter, the hydrophilic substrate is not any one of a zeolite, activated charcoal, charcoal, activated alumina, clay, diatomaceous earth, granulated ferric hydroxide, and fly ash. In embodiments, when the coated substrate is to be used to remove arsenic from water, the coated substrate is based upon a substrate which is not an ash, a bottom ash, fly ash, or another combustion by-product from burning wood, coal, or plant materials. In embodiments where the coated substrate is used to remove contaminants other than arsenic from water, there are further embodiments in which the coated substrate is based on a substrate which can be can be bottom ash, fly ash, or another combustion by-product from burning wood, coal, or plant materials.

In another aspect, the invention provides methods for removing contaminants from water (e.g., drinking water, ground or surface water source drinking water, contaminated run-off water, effluent from industrial, mining or agricultural operations). The contaminant may be a compound of selenium (e.g., $Na_2SeO_3$, sodium selenite; $Na_2SeO_4$, sodium selenate), arsenic, chromium (e.g., chromium(VI) trioxide, chromium (III)), uranium, lead, or vanadium, including salts thereof or combinations of them.

For instance, in one aspect, water containing the contaminant to be removed is contacted with a ferric hydroxide and/or ferric oxyhydride coated-hydrophilic substrate according to the invention. In one embodiment, the ferric hydroxide and/or ferric oxyhydride coated-hydrophilic substrate is made according to the above described methods. The contacting may be accomplished by percolating or filtering the water through the substrate, mixing the water with the substrate by stirring, turbulence of the water flow, or agitation and/or prolonged contact and diffusion. Upon contacting of the contaminate containing water with the coated substrate, the contaminant(s) therein binds to the ferric hydroxide or oxyhydride coating on the substrate, forming complexes that are insoluble and tightly bound to the substrate. Separating or removing the coated substrate from the treated water serves to remove the contaminant bound to the coated substrate from the water. As the substrate can be insoluble and particulate and typically denser than the water, this task can generally be accomplished easily by filtration or simply by allowing the contaminant-bearing substrate to settle from the treated water.

In some embodiments, the contaminant to be removed from the water is an inorganic form of any one of selenium, chromium, vanadium, or arsenic. In other embodiments, the species is a divalent, trivalent, pentavalent, or hexavalent species of the contaminant as may be found in ground water or contaminants from urban run-off, or agricultural and industrial operations.

The method can be used to treat water containing the contaminant (e.g., selenium or arsenic) over a wide concentration range (e.g., 5 ppb to 5000 ppb, 10 to 2500 ppb, 1 ppb to 1000 ppb or higher; 10 ppb to 1000 ppb; 5 ppb to 2000 ppb; 10 ppb to 100 ppb, 5 ppb to 1000 ppb; or 5 ppb to 500 ppb (by weight)). Preferably, the method is used to treat water having contaminant levels at or above 10 ppb, 20 ppb, 50 ppb, or 100 ppb. To help protect health or the environment, the removal need not be complete as the likelihood and severity of any adverse effects can be reduced by even a partial reduction in the levels of a contaminant. Generally, it is desirable for the contaminant removal to reduce the contaminant below levels thought to cause harm. In embodiments, where the coated substrate is used to remove arsenic from water, the coated substrate is based upon a substrate which is not one or more of an ash, bottom ash, fly ash, or another combustion by-product from burning wood, coal, or plant materials. In embodiments where the coated substrate is used to remove contaminants other than arsenic from water, there are further embodiments in which the coated substrate is based on a substrate which can be can be bottom ash, fly ash, or another combustion by-product from burning wood, coal, or plant materials.

In one set of embodiments, the invention is drawn to a method of removing arsenic from a drinking water source (e.g., particularly, ground water or a poorly oxygenated source of water), by, optionally, first treating the water to help convert any organic arsenic therein (e.g., methane arsonic acid, sodium methane arsonate, sodium dimethyl arsinate, dimethyl arsinic acid, ) and/or inorganic trivalent arsenic therein (e.g., arsenic trioxide, sodium arsenite, ) to a pentavalent form of arsenic (e.g., arsenic pentoxide, pentavalent arsenic). The treating may be by means of adding an oxidizer (e.g., hydrogen peroxide, potassium permanganate, sodium hypophosphite) to the water to be treated. Preferably, the oxidizer can be selected from ozone, oxygen, chlorine, or hypochlorous acid, or bleach, or combinations thereof. Oxygen can be supplied by bubbling or injecting air into the water. Alternatively or, in addition, the water can first be contacted with a colorant or color center and then irradiated with ultraviolet light of sufficient energy (e.g., sunlight, man-made source UV light), whereby the colorant or color center facilitates absorption of the ultraviolet and oxidation of the arsenic species to its valence $^{+}5$ state. Concomitant with and/or after the oxidizer treatment, the water is then contacted with the ferric hydroxide and/or ferric oxyhydride coated substrate to remove the arsenic therefrom as described above.

When the contaminant is arsenic, water containing the arsenic to be removed is contacted with a ferric hydroxide and/or ferric oxyhydride coated-hydrophilic substrate according to the invention. In one embodiment, the ferric hydroxide and/or ferric oxyhydride coated-hydrophilic substrate is made according to the above-described methods. The contacting may be accomplished by percolating or filtering the water through the substrate, mixing the water with the substrate by stirring, turbulence of the water flow, or agitation and/or prolonged contact and diffusion. Upon contacting of the arsenic contaminated water with the substrate, the arsenic species therein bind to the ferric hydroxide or oxyhydride, forming complexes that are insoluble and tightly bound to the substrate. Separating or removing the substrate from the treated water serves to removes the arsenic bound to the substrate from the water. As the substrate can be insoluble and particulate and typically denser than the water, this task can generally be accomplished easily by filtration or simply by allowing the arsenic-bearing substrate to settle from the treated water.

In some embodiments, the arsenic species to be removed from the water is inorganic arsenic. In other embodiments, the arsenic species is a trivalent or pentavalent arsenic species. In other embodiments, the arsenic species is one or more members selected from the group consisting of arsenic acid, arsenic trioxide, arsenic pentoxide, pentavalent arsenic or trivalent arsenic, sodium arsenite and/or salts thereof. In yet other embodiments, the arsenic species is an organic arsenic (e.g., methane arsenate, sodium methane arsenate, dimethyl arsenic acid, dimethyl arsenic acid) which is first converted to an inorganic arsenic by methods known to one of ordinary skill in the art. (e.g., by oxidation).

The method can be used to treat water containing arsenic over a wide concentration range (e.g., 5 ppb to 5000 ppb, 10 to 2500 ppb, 1 ppb to 1000 ppb or higher; 10 ppb to 1000 ppb; 5 ppb to 2000 ppb; 10 ppb to 100 ppb, 5 ppb to 1000 ppb; or 5 ppb to 500 ppb (by weight)). Preferably, the method is used to treat water having arsenic levels at or above 10 ppb, 20 ppb, 50 ppb, 100 ppb, 500 ppb, 1000 ppb, 2,000 ppb, 2500 ppb, 3,000 ppb or 5,000 ppb. To help protect health, the removal need not be complete as the likelihood and severity of any adverse health effects will be reduced by even a partial reduction in the levels of arsenic. Generally, it is desirable for the arsenic removal to reduce the arsenic levels below 10 ppb (i.e., below 10 micrograms per liter of water) or even lower. Thus, in one embodiment, the method is used to reduce the level of arsenic in the water to levels below 50 ppb, 40 ppb, 30 ppb, 20 ppb, 10 ppb, 8 ppb, 5 ppb, 3 ppb, 2 ppb, 1 ppb, or the limit of detection.

In another aspect, the invention is drawn to a method of removing arsenic from a drinking water source (e.g., particularly, ground water or a poorly oxygenated source of water), by first treating the water to help convert any organic arsenic therein (e.g., methane arsonic acid, sodium methane arsonate, sodium dimethyl arsinate, dimethyl arsinic acid, etc.) and/or inorganic trivalent arsenic therein (e.g., arsenic trioxide, sodium arsenite, etc.) to a pentavalent form of arsenic (e.g., arsenic pentoxide or pentavalent arsenic). The treating may be by means of adding an oxidizer (e.g., hydrogen peroxide, potassium permanganate, sodium hypophosphite, etc.) to the water to be treated. Preferably, the oxidizer can be selected from ozone, oxygen, chlorine, or hypochlorous acid, or bleach, or combinations thereof. Oxygen can be supplied by bubbling or injecting air into the water. Alternatively or, in addition, the water can first be contacted with a colorant or color center or and then irradiated with ultraviolet light of sufficient energy (e.g., sunlight, man-made source UV light), whereby the colorant or color center facilitates absorption of the ultraviolet and oxidation of the arsenic species to its valence $^{+}5$ state. Concomitant with and/or after the oxidizer treatment, the water is then contacted with the ferric hydroxide and/or ferric oxyhydride coated substrate to remove the arsenic therefrom as described above. In some embodiments, where the coated substrate is used to remove arsenic from water, the coated substrate is based upon a substrate which is not a bottom ash, fly ash, or another combustion by-product from burning wood, coal, or plant materials. Other contaminants as described above can be similarly oxidized to facilitate their removal.

In some embodiments of the above, other transitional trivalent metal hydroxides can be substituted for the ferric hydroxide. One of ordinary skill in the art would readily ascertain which such transitional trivalent metals are capable of forming complexes with arsenic and the like and, therefore, would be suitable for use in the various methods and compositions according to the instant invention.

BRIEF DESCRIPTION OF THE DRAWINGS

The invention will be more fully understood by reference to the following drawings, which are for illustrative purposes only.

This is equivalent to reducing arsenic concentration from 50 to below 10 ppb in 100 liters of arsenic-laced water with just 6.67 g of media.

Figure 6:
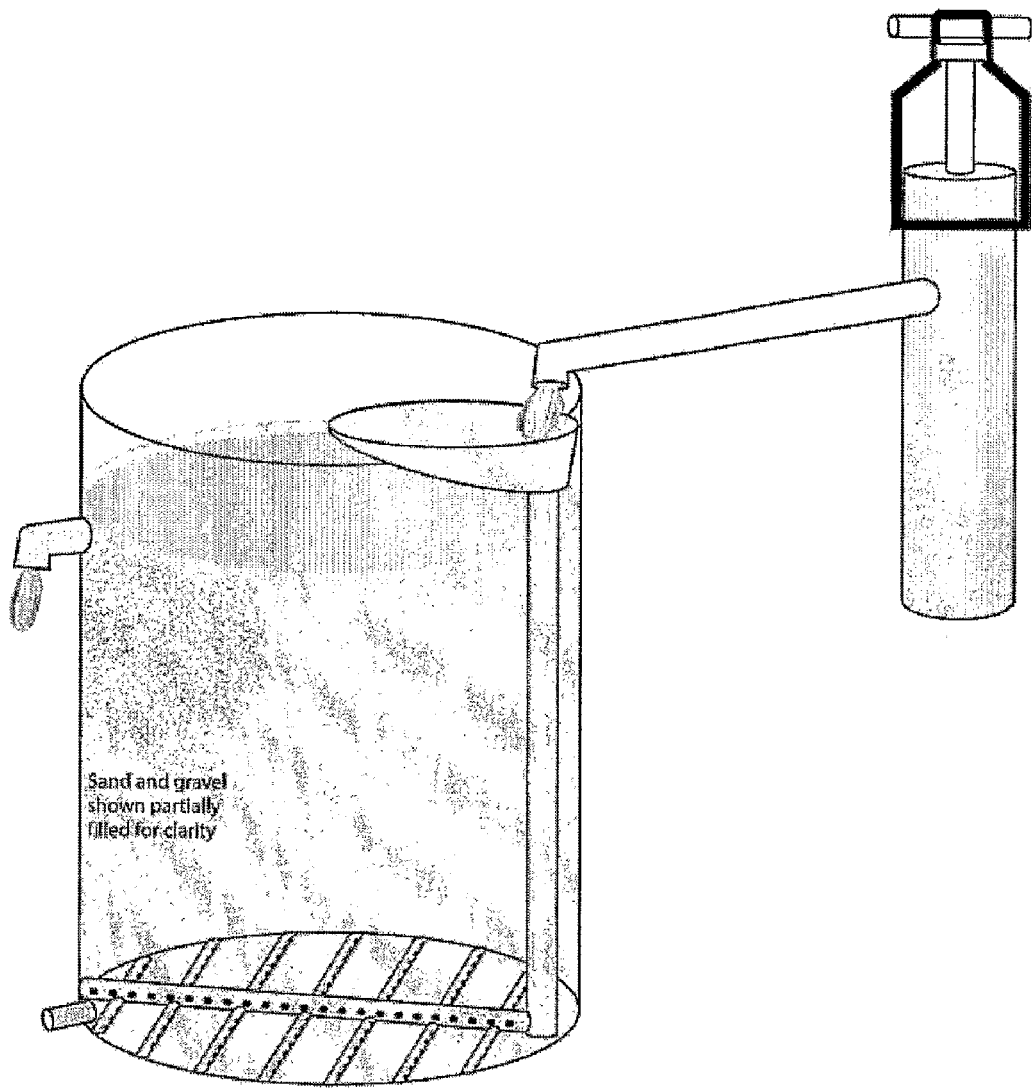

FIG. 6 illustrates a community-scale roughing filter, suitable for 20 families drawing water from a single hand pump.

DETAILED DESCRIPTION OF THE INVENTION

This invention is related to the discovery that ferric hydroxide and/or ferric oxyhydride coated materials can be readily made from certain commonly available substrates to afford highly effective methods for removing contaminants, such as arsenic, from water, particularly, drinking water. For instance, ferric hydroxide and/or ferric oxyhydride bottom ash can remove 0.7 milligrams of elemental arsenic from water per gram of the coated media, leaving the final concentration of arsenic in the water below 10 ppb. The ferric hydroxide and/or ferric oxyhydride coated bottom ash have repeatedly been tested against arsenic concentrations from 60 ppb to 2400 ppb in water spiked with arsenic. An advantage of the substrates of the present invention, as illustrated with the ferric hydroxide and ferric oxyhydride coal bottom ash substrate, as well as the methods of the present invention is the extent to which they are able to remove substantial amounts of contaminants, including trivalent arsenic as well as pentavalent arsenic, from contaminated water.

Thus, the invention provides compositions and methods for removing contaminant (e.g., arsenic, selenium, etc.) species from water, particularly drinking water. The compositions are substrates whose internal and/or external surfaces are coated with ferric hydroxide and/or ferric oxyhydride. A wide variety of substrates are contemplated as described above. Particularly advantageous substrates are bottom ash, fly ash, glass and the like. Substrates need not be completely coated with the ferric hydroxide and/or ferric oxyhydride to be effective. However, effectiveness is generally proportional to the degree of coating. Thus, in some embodiments, the substrate surfaces are substantially coated with the ferric hydroxide and/or ferric oxyhydride as provided for in the instant methods of making them. Generally, it is preferred that at least 10% or 25% of the surface sites available for coating be so coated or adsorbed with the ferric hydroxide and/or ferric oxyhydride. In other embodiments, greater than 25%, 50%, 75%, or 90% of the visible external substrate surface is coated with the ferric hydroxide and/or ferric oxyhydride.

In some embodiments of each of the above, particularly where potable or drinking water is concerned, the bottom ash or other selected substrate can be substantially free of toxic contaminants (e.g., heavy metals, inorganic or organic compounds) capable of entering in harmful amounts into the water to be treated when the substrate is used according to a particular method of the invention. Methods for testing substrates for such contaminants and/or their ability to enter or leach into water are well known to those of ordinary skill in the arts. In addition, the ferrous salts and hydroxide metal counterions selected in the making of the ferric hydroxide and/or ferric oxyhydride coated substrates are preferably non-toxic with respect to any residue or contaminant they may leave in the treated water. Such non-toxic counterions (e.g., calcium, sulfate, sodium, potassium, etc.) are well known to persons of ordinary skill in the art. Thus, in one aspect of the invention, the selection of an industrial waste product such as coal bottom ash (e.g., coal bottom ash from a coal-burning power plant burning coal) for use in the compositions and methods according to the instant invention is surprising. Stringent testing indicated that aqueous extracts of a coal bottom ash obtained had non-detectable or negligible amounts of As, Be, Cd, Cr, Cu, Tl, Pb and Se over a pH range of 3 to 10.

In another aspect, the invention is drawn to methods of making the ferric hydroxide and/or ferric oxyhydride coated materials by first coating them with a ferrous compound to avoid having to mix while avoiding the use of ferric compounds as added reagents. Aqueous solutions of ferric compounds are typically highly viscous and tend to form gels making chemical mixing difficult to accomplish.

Suitable methods for making the ferric hydroxide and/or ferric oxyhydride substrate compositions of the instant invention are illustrated in the Examples below and described above.

In general, the methods for accomplishing the individual reaction steps required to coat a substrate with a ferric hydroxide and/or ferric oxyhydride coating would be readily appreciated by one of ordinary skill in the art given the sequence of steps. Such methods are illustrated in the Examples. The concentration of ferrous salt to be contacted with the selected substrate can be, for instance, in the range of from 0.1 M to a saturated solution of the salt. The contact time depends upon the temperature, the concentration of the ferrous salt contacting the substrate, the extent of mixing, the substrate itself, and the amount or concentration of the substrate to be tested. One of ordinary skill in the art would appreciate how to vary the reaction conditions (e.g., concentration of the ferrous salt, temperature, contact time, etc.) so as to provide the ferrous salt treated substrate. Similarly, given a ferrous sulfate coated surface to be converted to a ferrous hydroxide coated surface, one of ordinary skill in the art would know the approximate concentrations of base to use or add to the resulting ferrous salt treated substrate to convert the ferrous sulfate treated substrate to a ferrous hydroxide coated substrate. Given a ferrous hydroxide coated surface to be converted to a ferric hydroxide or ferric oxyhydride coated surface, one of ordinary skill in the art would also readily appreciate the means required to convert the ferrous hydroxide coated substrate to a ferric hydroxide and/or ferric oxyhydride-coated substrate suitable for use according to the present invention.

One of ordinary skill in the art would appreciate how to contact the substrate with water so as to effectively remove any contaminant (e.g., arsenic, selenium, etc.) present in the water. The water to be treated can be contacted with the ferric hydroxide and/or ferric oxyhydride substrate by a variety of methods as known to one of ordinary skill in the water treatment art. The substrates may be used in a fixed bed or a fluidized bed format. The substrates may be packaged in porous containers inserted into the water or separated by porous membranes from the water to be treated. The substrates may be employed prior to activated charcoal or sand filtration of the water or thereafter. Flocculants may be used to enhance separation of the substrate from the water at the end of contacting. The substrates may be packaged into cartridges or small columns to be installed at the consumer level (e.g., a household kitchen sink or household outlet, a public drinking fountain, or public well). The substrate may be inserted into a stirred or agitated tank and then removed by settling and/or filtration. The substrates and methods may be used in tandem or in series with any other water decontamination/disinfection procedures known to one of ordinary skill in the art.

In particular, the process may be performed one or more time sequentially on a water source to increase the reduction in the arsenic content thereof, to provide a more complete removal of the arsenic, or to help insure adequate removal of the arsenic. In practice, it is preferable that the method also be performed in conjunction with testing the treated water to determine the levels of contaminant in the treated water to insure that they are within acceptable limits (e.g., below 10 ppb or 50 ppb, depending on the contaminant) or in accordance with local regulations or international public health guidelines, such as those set by the World Health Organization or United States Environmental Protection Agency with respect to arsenic and selenium in drinking water. Methods of monitoring water for such contaminant are well known to one of ordinary skill in the art. For instance, the residual concentration of arsenic or other contaminants in the solution can be analyzed by ICP/MS methods known to one of ordinary skill in the art. In some embodiments, the methods of the instant invention can reduce arsenic or selenium levels by up to 90% or more and, in particular, can reduce arsenic to levels of 50 ppb or less and, more preferably, to levels of 10 ppb or less.

The amount of the ferric hydroxide and/or ferric oxyhydride coated substrate to be contacted with the water can be determined empirically by methods available to one of ordinary skill in the art. Typically, the amount needed will be determined according to the concentration of the contaminant in the water, the species and/or valence state of the contaminant, the degree of reduction sought in the contaminant levels, the duration of the contact time between the substrate and the water, the completeness of the contacting (e.g., degree of admixing) over that time, as wells as the surface area, size, extent of coating, and composition of the coated substrate. Parameters such as water temperature may also be addressed. The amounts of substrate to be used can preferably be determined empirically and adjusted according to the contaminant reduction achieved as compared to the arsenic contaminant reduction sought for a given set of contacting conditions. Noting the above, the ferric hydroxide and/or ferric oxyhydride coated substrates can thus generally be used in an amount, or minimal amounts, from 0.01 to 100 grams per liter of treated water, or more preferably in amounts from 0.1 to 10 grams per liter treated water. The actual amounts or minimal amounts needed depend on the factors noted above. In addition, the contacting can be repeated sequentially to provide an extra margin of safety or security and/or further reduction in contaminant levels.

The methods according to the invention are extremely scalable and can be used for purifying water from hand-pumped wells, in small town water systems in the developing world, and in small or large municipal water systems in the industrialized world. Purification for individual home use in a developing country would require only a coated substrate impregnated fabric or paper sheet or towel, a substrate coated fabric or paper sheet, a filter comprising the coated substrate, a holding or filter bag filled with the coated substrate, etc. As little as a few ounces in a "tea bag" or similar porous container can treat several gallons of water to greatly reduce contaminant levels therein. The drinking water would be dripped through the filter or contacted with the filter bag or coated or impregnated sheets to reduce the contaminant levels. The bag and filter or sheets may later be discarded. For community level systems, the method is compatible with commonly found small roughing filters and a hand-pump or simple machinery would inject a slurry of the coated media into water flow upstream of a settling tank.

Users in household can implement this technology by enclosing the ferric hydroxide or ferric oxyhydride coated substrate within two layers of filter paper or any other porous sheets or polymer material, similar to the coffee filter pouches or tea bags found in many U.S. hotels. The material could be poured through a paper filter or other filter material. Water passing through the filter material to reach the coated substrate will lose its arsenic or selenium or other contaminant by adsorption or bonding to the coated substrate. A substantial amount of arsenic or other contaminant removal can occur in minutes improving the water quality greatly. The bound contaminant (e.g., when arsenic, in the form of ferric arsenate), will remain with the coated substrate and can be disposed of with the filter or pouch.

To treat arsenic-laden water at a community level, the substrate could be added to the inlet of a small roughing filter. These filters are commonly used to filter turbid water. An illustrative implementation would consist of a 55 gallon drum filled with a mixture of coal (anthracite), sand, and gravel. Turbid water is hand pumped in through a hose that runs down to the bottom of the drum and is dispersed at the bottom. It makes its way up through the mixed media and exits through an overflow weir (FIG. 6). The ferric hydroxide or ferric oxyhydride coated substrate would be added daily to the inlet hose and the water would be simultaneously cleaned of arsenic and turbidity as it made its way through the mixed media filter. At periodic intervals (e.g. weekly), the filter would be backwashed by opening the backwash plug at the bottom.

The ferric hydroxide or ferric oxyhydride coated substrate can also be used for arsenic removal on a large scale and integrated with more complex systems of water treatment. For instance, a slurry of the ferric hydroxide or ferric oxyhydride coated substrate can be injected continuously into a water pipe via slurry injection a few minutes upstream of a large settling tank or filter, where the spent media would be removed.

Another application for the ferric hydroxide or ferric oxyhydride coated substrate is the removal of arsenic from mine leachates. Water leaching from old, inactive mines or from active, working mines into rivers, streams, and municipal water supplies is often contaminated with arsenic. This technology offers a way to neutralize leachates before they contaminate the environment.

In other applications a standing body of water, such as a pond or a lake, having a contaminant (e.g., compounds of selenium or arsenic) is contacted with a suitably large amount of a ferric hydroxide or ferric oxyhydride coated substrate which may, for example, be applied to its surface or beneath the surface. The substrate complexes with the contaminant and falls to the bottom where it is sequestered and/may be removed by dredging or draining the body of water at various times.

DEFINITIONS

Unless defined otherwise, all technical and scientific terms used herein have the meaning commonly understood by a person skilled in the art to which this invention belongs. The following references provide one of skill with a general definition of many of the terms used in this invention: Singleton et al., DICTIONARY OF MICROBIOLOGY AND MOLECULAR BIOLOGY (2d ed. 1994); THE CAMBRIDGE DICTIONARY OF SCIENCE AND TECHNOLOGY (Walker ed., 1988); THE GLOSSARY OF GENETICS, 5TH ED., R. Rieger et al. (eds.), Springer Verlag (1991); and Hale & Marham, THE HARPER COLLINS DICTIONARY OF BIOLOGY (1991). As used herein, the following terms have the meanings ascribed to them unless specified otherwise.

It is noted here that as used in this specification and the appended claims, the singular forms "a," "an," and "the" include plural reference unless the context clearly dictates otherwise.

"Bottom ash" means the refuse left behind after partial or complete combustion of bituminous, anthracitic, or lignitic coal or wood, rice, rice husks, or other partially or completely combusted carbonaceous material.

With respect to impurities in water, "contaminant" refers to substances which are harmful to health or the environment and can be directly adsorbed by ferric hydroxide or ferric oxyhydride coated substances or be first oxidized to a species as described herein and which can then be so adsorbed. Such contaminants include oxidized and oxidizable forms of arsenic, selenium, and oxidized and oxidizable species of other elements including, but not limited to, uranium, lead, cadmium, nickel, copper, zinc, zirconium, chromium and vanadium as wells as the soluble inorganic salts thereof. Generally, the contaminant can adsorb or bind to the ferric hydroxide or ferric oxyhydride coated-substrate when the contaminant is in an oxidized state or oxidation state which forms dissociated ions in water.

"Fly ash" means a "fine particulate, essentially noncombustible refuse, carried in a gas stream from a furnace", as defined in the McGraw-Hill Dictionary of Scientific and Technical Terms, Fifth Edition, McGraw-Hill, Inc., 1994.

With respect to the substrate according to the invention, the term "coated" refers to the presence of adsorbed, adherent or bound ferrous or ferric compounds to the surface of the substrate particle. Without being wed to theory, it is believed the forces adhering, adsorbing, or coating the ferrous and ferric compounds to the disclosed substrate are based upon the hydrophilic and/or electronegative properties of the substrate's surface. These forces may be Van der Waal forces, ionic attractions, hydrogen bonding, coordinate covalent bonds or combinations of the above forces according to the particular substrate. The term 'coated' does not require that the particle or substrate be completely covered by the subject ferrous or ferric compounds. The extent of such coverage can be as described above.

The water to be treated includes, but is not limited to, ground water or surface water contaminated with arsenic, selenium or other contaminants as defined above. The water can be contaminant laden run-off (e.g., run-off carrying arsenical pesticides), or contaminated waste water from industrial or mining operations. In some embodiments, the water is a source of drinking water. The water may be a water which has been treated to improve clarity, remove particulates, reduce bacterial content, or eliminate other contaminants, before the water is contacted with the ferric hydroxide and/or ferric oxyhydride treated substrate to remove or reduce the levels of any contaminant in the water.

In other aspects, the compositions and methods of the invention are suitable for removing other elements found in water which are reactive with or adsorb to ferric hydroxide and/or ferric oxyhydride.

EXAMPLE 1

Use of Bottom Ash as an Exemplary Substrate

In one embodiment, bottom ash from a power plant located in the area in which the water to be treated is located can be used. For instance, South Asian coal fired thermal power plants generate a large quantities of bottom ash suitable for use in the instant invention. This ash is a sterile, finely powdered material with spherical particles consisting mostly of iron, magnesium and aluminum silicates. The particle size range is generally from 1 to 10 microns providing a surface area to volume ratio of about 0.5 m$^2$ per cm$^3$ of the powder. This material is available in the year 2005 for about $4 per ton for disposal from thermal power plants. The instant methods allow the bottom ash to be coated with ferric hydroxide and/or ferric oxyhydride using simple chemistry at room temperatures and avoiding the use of expensive raw materials and high energy expenditures.

One kg of the media can remove 0.7 gm of elemental arsenic from drinking water, which would be equivalent to removing arsenic from 1000 liters of water with 700 ppb arsenic. Estimating the drinking water consumption per person to be 10 liters per day (3650 liters per year), treating one person's annual drinking water, with initial arsenic concentration of 700 ppb, may cost about $1.10.

In one embodiment, the invention provides a method for coating bottom ash or other substrate for arsenic removal in water, comprising:
  a) mixing a quantity of bottom ash or substrate in a liquid comprising water to form a bottom ash suspension;
  b) treating said bottom ash or other substrate suspension with an $FeSO_4$ (or other ferrous salt) aqueous solution to form a treated bottom ash suspension; and
  c) then reacting said treated bottom ash or other substrate suspension with a NaOH aqueous solution to form a coated $Fe(OH)_2$ bottom ash suspension.

The treating step $FeSO_4$ aqueous solution can comprise use of a $FeSO_4$ solution greater than 0.1 M in concentration. A saturated $FeSO_4$ solution of about 0.6 M may, for instance, be used. The NaOH solution may be from 0.1 to 1 N, for instance, 0.5 N.

In some embodiments, the invention provides means for adsorbing aqueous arsenic from a quantity of water by contacting the water with a $Fe(OH)_2$ bottom ash or substrate as might be prepared according to the above methods. In another embodiment, the method also comprises use of a means to change the arsenic in said water from a $As^{+3}$ valence state to the $As^{+5}$ valence state prior to contacting said water with said $Fe(OH)_2$ bottom ash or substrate.

In one set of embodiments described separately below, this invention provides for a method for arsenic impurity removal from drinking water, the method comprising: a) collecting bottom ash; b) treating said bottom ash with $FeSO_4$ solution; and c) then treating said bottom ash with NaOH solution. The initial collected bottom ash may be first washed to remove impurities. Also, said bottom ash may have a further step of further washing the bottom ash after treatment with the NaOH solution.

The treated bottom ash above may further comprise the step of oxidizing said bottom ash. The oxidizing step may be performed by air drying, addition of hydrogen peroxide, potassium permanganate ($KMnO_4$), bubbled air, sodium hypophosphite ($NaH_2PO_2 \cdot H_2O$), hydrogen peroxide ($H_2O_2$), or other similar oxidizing agent. Additionally, nonoxidizing agents such as $FeSO_4$ may provide a colorant or color center for absorption of ultraviolet light. Such absorbed photons provide energy for the surface oxidation of the coated bottom ash from an $Fe(OH)_2$ state to an $Fe(OH)_3$ state in the aqueous solution. These states are readily discernable by the yellowish to greenish patina of the $Fe(OH)_2$ compared to the rust colored state of $Fe(OH)_3$. When the treated bottom ash is coated with the $Fe(OH)_3$, it is ready to act as an adsorbent material for impurities in a water source, such as arsenic or possibly other heavy metals.

After said treated bottom ash has been prepared and oxidized, one may begin removing impurities from a quantity of water using said treated, dried bottom ash. The removing step is typically performed by adsorbing contaminant ions from a quantity of water in a form complexated with iron ions previously coated on the treated bottom ash surface.

EXAMPLE 2

Preparation of 5 Grams of Pre-treated Bottom Ash

Initially, 5 grams of dry bottom ash are placed in a holding container.

Approximately 30 ml of 0.6 Molar $FeSO_4$ is mixed with the bottom ash, and continuously stirred for an hour at near room temperature, e.g. 10-40 degrees C. Although this is the room temperature saturation concentration of the $FeSO_4$, lower concentrations could be used for either lower bottom ash surface coverage, or lower quantities of bottom ash. It is possible that $FeSO_4$ concentrations could be usable from the range of 0.1 M or greater.

After stirring, the solid bottom ash particulate is allowed to settle to the bottom of the holding container for about 5 minutes. At this point, the surface liquid is removed, filtered, and the residue on the filter paper added to the dense mixture at the bottom of the holding container.

The holding container is then stirred with an aqueous solution of 5 ml of 0.5 N NaOH, and the contents mixed well for 5 minutes. It is thought that the NaOH processes the previous $FeSO_4$ into a complex ferrous state of $Fe(OH)_2$ according to the oxidation reduction chemical formula $FeSO_4 + 2NaOH \rightarrow Fe(OH)_2 + Na_2SO_4$, which forms an improved arsenic adsorbent.

Drain off the excess surface liquid after the solids are allowed to settle to the bottom of the holding container for about 5 minutes. At this point, the surface liquid is removed, leaving a dense processed mixture at the bottom of the holding container.

Spread the contents of the holding container on a filter paper, place in a Petri dish, and dry at room temperature in open air in a fume hood for a period of 36 hours. This serves the function of oxidizing the coated $Fe(OH)_2$ bottom ash to form a coated $Fe(OH)_3$ bottom ash, which has been found to be much better at adsorbing arsenic in water than the $Fe(OH)_3$ form.

Wash the dried material from the previous step three times using each time about 100 ml arsenic-free water to remove any non-adsorbed NaOH or $Fe(OH)_2$ solute. At the end of each wash, filter the supernatant, and add the residue on the filter paper back to the solids. At the end of the third wash, the solids are the prepared medium (adsorbent).

Use the adsorbent media in the following manner: add arsenic-laden water to the adsorbent, stir for a sufficient time to adsorb aqueous arsenic (typically about an hour), and then decant the liquid.

In laboratory test, the adsorbent medium was able to remove arsenic from 2000 ml of 2.4 ppm (parts per million, or alternatively 2400 parts per billion, ppb) arsenic laden water to bring the arsenic concentration to a level of 50 ppb or below, as described in FIG. 2.

EXAMPLE 3

Use of Pre-treated Bottom Ash for Arsenic Removal

In practice, an arsenic laden water source is mixed with the coated $Fe(OH)_3$ coated bottom ash sufficiently to reduce the arsenic levels to an acceptable level. Presently, for the United States Environmental Protection Agency (US EPA), that level is 50 ppb, however, it will be reduced to 10 ppb beginning January 2006. The World Health Organization (WHO) has already announced that it recommends the provisional value for acceptable arsenic concentration in drinking water be changed to a lower limit to below 10 ppb.

Improved adsorption performance may be obtained by pre-treating the arsenic laden water with ultraviolet light, so as to change the state of the aqueous arsenic from $As^{3+} \rightarrow As^{5+}$. Normally, clear water allows ultraviolet light to pass through without absorption. However, with the addition of a colorant or color center source, ultraviolet light will be absorbed, energizing the ions to change the arsenic valence state.

It should be noted that atmospheric, freely flowing water, usually contains an abundance of $As^{5+}$ due to the oxygen present in the water. However, well-borne water may fail to have an oxygen source, and may be predominated by $As^{3+}$ state. It is also believed that the state change to the pentavalent state may be achieved through oxidation additives such as bubbled air, potassium permanganate ($KMnO_4$), sodium hypophosphite ($NaH_2PO_2 \cdot H_2O$), or hydrogen peroxide ($H_2O_2$). Such additives may be dry or aqueous based.

As with both of the two water sources above, arsenic is removed though adsorption of the arsenic ions onto the pre-treated bottom ash. At some point, most receptor sites are occupied by arsenic ions, precluding reaching the maximum acceptable level as may be revealed by monitoring water from arsenic. At this point, the pre-treated bottom ash is disposed, and replaced with new pre-treated bottom ash.

It has been found experimentally that large oversupplies of coated $Fe(OH)_3$ bottom ash (amounts sufficient to normally treat 25 times more of $As^{5+}$) have successfully removed water borne arsenic to acceptable levels of 10 ppb or lower, even without raising the arsenic valence state to $As^{5+}$. Thus, it is possible to calculate whether it is more economical to use more media, or raise the arsenic valence level to the pentavalent state.

Figure 1:
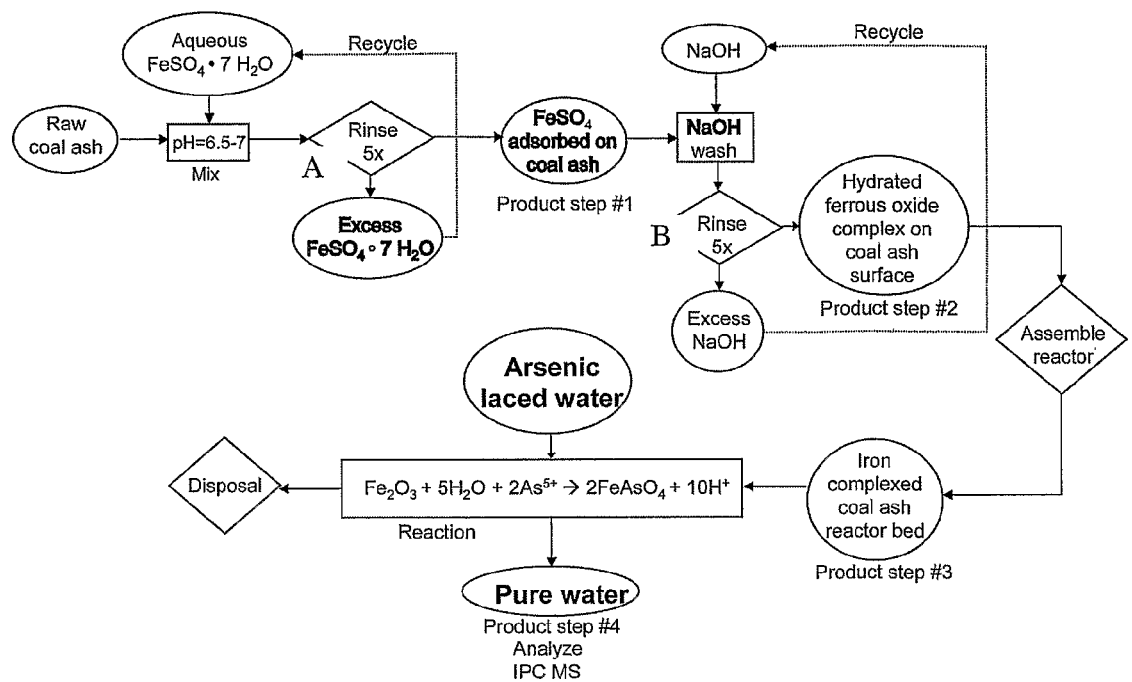
FIG. 1 is a flow chart of the pre-treatment and use steps of bottom ash for aqueous arsenic removal.

Refer now to FIG. 1, which shows the process flow for treatment of bottom ash to manufacture coated $Fe(OH)_3$ bottom ash. These steps follow those of Example 1 described above.

Figure 2:
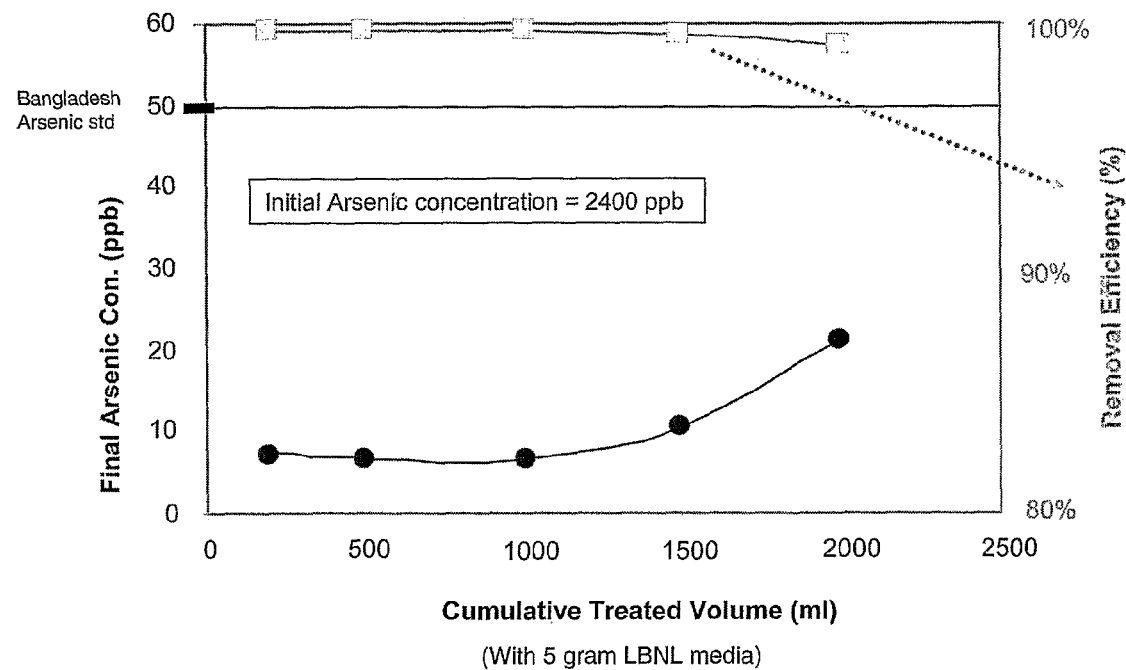
FIG. 2 is a chart of residual arsenic remaining after successive batches of 2400 parts per billion (ppb) arsenic-laden drinking water has been treated with the adsorbent treated bottom ash of this invention.

Refer now to FIG. 2. To give a sense of scale of the effectiveness of the coated $Fe(OH)_3$ bottom ash media, highly arsenic laden water having initial concentrations of 2400 ppb (or 240 times the proposed WHO limits) is sequentially input, and after mixing, tested for arsenic concentrations. Using only 5 g of coated $Fe(OH)_3$ bottom ash, the initial 2400 ppb water only exceeds the 10 ppb limit at a total treated volume of 1500 mL. It appears logical that a sequentially staged treatment system would bring the output arsenic levels to extremely low levels well below the proposed 10 ppb level.

Figure 3:
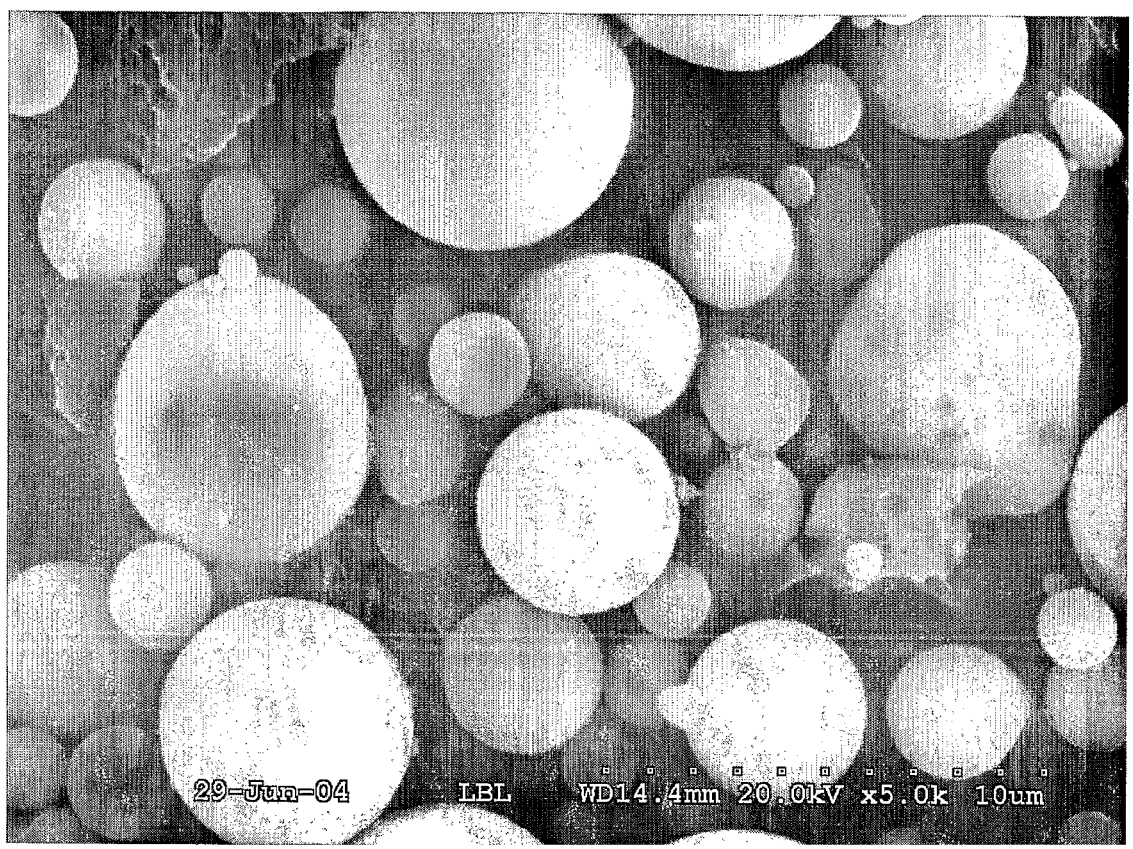
FIG. 3 is an electron micrograph of untreated bottom ash, showing a smooth bottom ash particle surface with a mixture of sizes from less than 1 micron to 10 microns diameter.

Refer now to FIG. 3, which shows uncoated bottom ash in an electron micrograph. The bottom ash particles vary in size, and tend to have a smooth surface.

Figure 4:
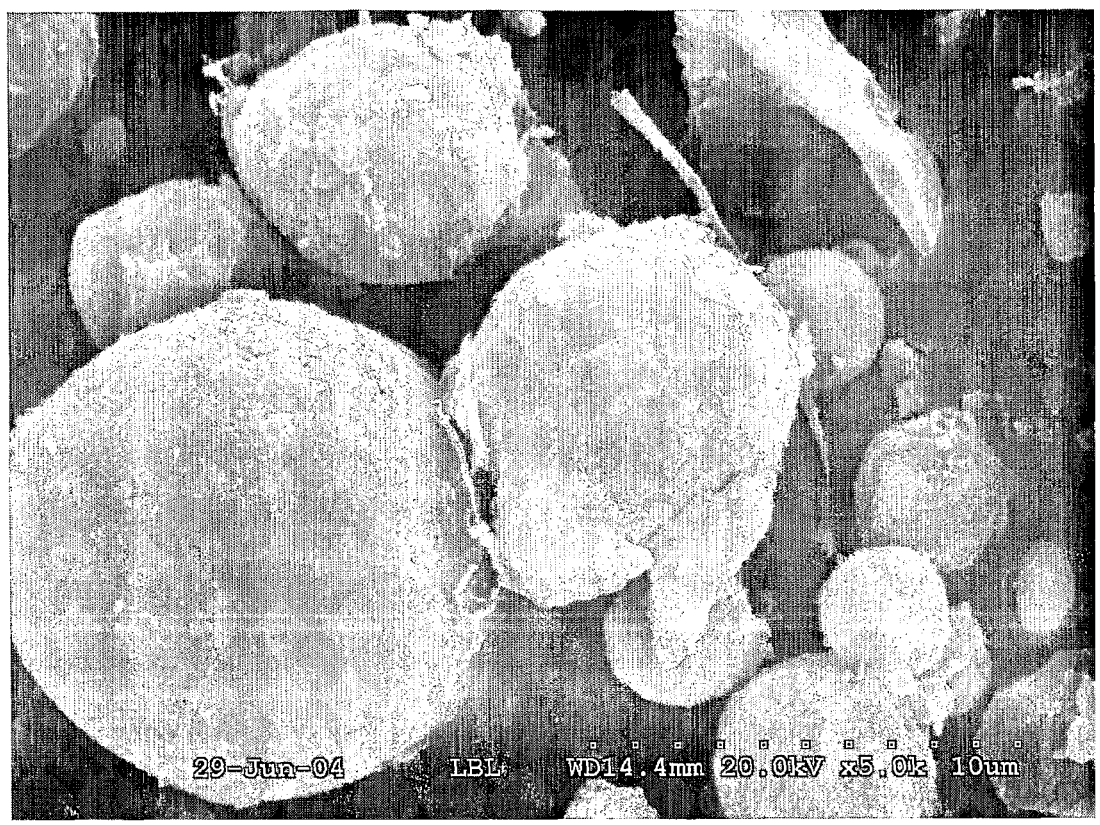
FIG. 4 is an electron micrograph of coated bottom ash, showing the $Fe(OH)_3$ coated bottom ash with a smooth to flaky surface appearance on particles of all sizes ranging from less than 1 µm to about 10 µm diameter, covering substantially all of the particulate surface.
Figure 5:
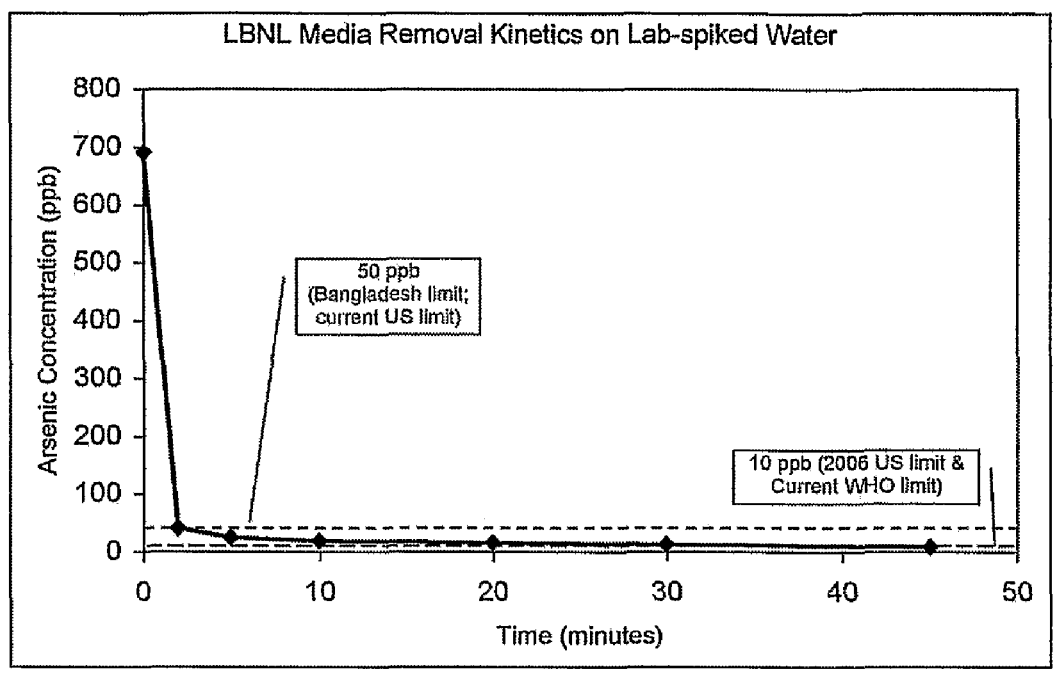
FIG. 5 illustrates the reduction of arsenic concentration in 0.5 L of 690 ppb water to 50 ppb in two minutes and to 10 ppb in 45 minutes. Tests were performed on several samples of water with differing concentrations of arsenic. The arsenic concentrations were measured with inductively coupled plasma mass spectrometric (ICP-MS) analysis of the filtered effluent. For deionized water spiked in the lab with arsenic$^{+5}$, one gram of the coated substrate removed 0.75 mg of arsenic.

Refer now to FIG. 4, which shows $Fe(OH)_3$ coated bottom ash. The nature of the coating is such that it appears to have one or more layers, and substantially covers each particle, regardless of size.

It should be noted that all of the discussions before have mixed the $Fe(OH)_3$ coated bottom ash in the arsenic laden water for arsenic removal. Alternative implementations could include a filter bag, with the arsenic laden water dripped though, or a percolation bed that has the water to be filtered passing through the bed. Additionally, any of these systems could be mixed or matched to provide for staged recovery of arsenic. Perhaps the easiest method is to mix the $Fe(OH)_3$ coated bottom ash with the arsenic laden water for a period of time by simple air bubbling. After ceasing air bubbling, the arsenic laden Fe(OH)$_3$ coated bottom ash should simply settle to the bottom, allowing water without arsenic to be withdrawn from the top.

EXAMPLE 3

The invention ion also further provides a method for arsenic impurity removal from drinking water, the method comprising: a) collecting bottom ash; b) treating said bottom ash with FeSO$_4$ solution; and c) then treating said bottom ash with NaOH solution. The initial collected bottom ash may be first washed to remove impurities. Also, said bottom ash may have a further step of further washing the bottom ash after treatment with the NaOH solution.

The treated bottom ash may also be further treated to oxidize said treated bottom ash. The oxidizing step may be performed by air drying, addition of hydrogen peroxide, potassium permanganate (KMnO$_4$), bubbled air, sodium hypophosphite (NaH$_2$PO$_2$·H$_2$O), hydrogen peroxide (H$_2$O$_2$), or other similar oxidizing agent. Additionally, nonoxidizing agents may provide a colorant or color center for absorption of ultraviolet light. Such absorbed photons provide energy for the surface oxidation of the coated bottom ash from an Fe(OH)$_2$ state to an Fe(OH)$_3$ state in the aqueous solution. These states are readily discernable by the yellowish to greenish patina of the Fe(OH)$_2$ compared to the rust colored state of Fe(OH)$_3$. When the treated bottom ash is coated with the Fe(OH)$_3$, it is suitable for use as adsorbent material for impurities in a water source, such as arsenic or possibly other heavy metals.

After said treated bottom ash has been prepared and oxidized, one may begin removing arsenic impurities from a quantity of water using said treated, dried bottom ash. The removing step is typically performed by adsorbing arsenic ions from a quantity of water in a form complexated with iron ions previously coated on the treated bottom ash surface.

The ability of the method to remove arsenic from water can be enhanced by exposing said quantity of water to ultraviolet radiation sufficient to change said aqueous arsenic to a higher valence state, preferably in the presence of dissolved oxygen. The source of this oxygen is preferably from the atmosphere as in air drying, but can also be from bubbled air, or addition of hydrogen peroxide, potassium permanganate (KMnO$_4$), or sodium hypophosphite (NaH$_2$PO$_2$·H$_2$O). In this manner the valence level of arsenic may raised from As$^{3+}$ to As$^{5+}$. It is thought that the As$^{5+}$ valence state is more easily adsorbed.

Each of the patents, published patent applications, and other publications cited in this specification are incorporated by reference in their entireties to the extent not inconsistent with the present disclosure. The following Appendix forms a separate and distinct part of the present disclosure.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method of reducing the amount of a contaminant in water, said method comprising contacting said water with a substrate coated with ferric hydroxide, ferric oxyhydride or their combination whereby the substrate reduces the concentration of the contaminant in the water, wherein the contaminant comprises a member of the group selected from selenium, uranium, cadmium, chromium, nickel, copper, zinc, vanadium, and lead, and wherein the substrate is bottom ash.

2. A method of claim 1, wherein the contaminant in water is in an amount from 10 micrograms per one liter of water to about 2500 micrograms per one liter of water.

3. A method of claim 1, wherein the amount of the contaminant in the water is reduced to below 10 micrograms per liter.

4. A method of claim 1, wherein the contaminant species is an oxidation state of uranium which forms dissociated ions in the water.

5. A method of claim 1, wherein the contaminant is an oxidation state of selenium which forms dissociated ions in the water.

6. A method of claim 1, wherein the contaminant is an oxidation state of lead which forms dissociated ions in the water.

7. A method of claim 1, wherein the contaminant is an oxide, which forms dissociated ions in water.

8. A method of claim 1, wherein the water is treated with UV radiation in the presence of a colorant prior to or during contact with the coated substrate.

9. A method of claim 1, wherein the coated substrate is separated from the water by filtration or settling after said contacting.

\* \* \* \* \*